(12) United States Patent
Longman et al.

(10) Patent No.: US 10,983,205 B2
(45) Date of Patent: Apr. 20, 2021

(54) REDUNDANT FREQUENCY MODULATORS IN RADAR SYSTEM

(71) Applicant: GM Global Technology Operations LLC, Detroit, MI (US)

(72) Inventors: Oren Longman, Tel Aviv (IL); Shahar Villeval, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 398 days.

(21) Appl. No.: 16/052,940

(22) Filed: Aug. 2, 2018

(65) Prior Publication Data

US 2020/0041636 A1 Feb. 6, 2020

(51) Int. Cl.
| | | |
|---|---|---|
| *G01S 13/34* | (2006.01) | |
| *H01Q 1/32* | (2006.01) | |
| *G01S 13/931* | (2020.01) | |
| *G01S 7/03* | (2006.01) | |
| *H04L 29/08* | (2006.01) | |

(52) U.S. Cl.
CPC .......... *G01S 13/343* (2013.01); *G01S 7/032* (2013.01); *G01S 13/931* (2013.01); *H01Q 1/3233* (2013.01); *H04L 67/12* (2013.01)

(58) Field of Classification Search
CPC ........ G01S 13/343; G01S 13/931; G01S 7/03; G01S 7/032; G01S 7/282; H01Q 1/3233; H04L 67/12
See application file for complete search history.

(56) References Cited

U.S. PATENT DOCUMENTS

| | | | | | |
|---|---|---|---|---|---|
| 3,621,450 | A | * | 11/1971 | Blair | H03B 23/00 331/10 |
| 3,699,448 | A | * | 10/1972 | Martin | H03B 23/00 331/4 |
| 4,388,622 | A | * | 6/1983 | Fletcher, Jr. | G01S 13/343 342/112 |
| 6,353,406 | B1 | * | 3/2002 | Lanzl | G07C 9/28 342/118 |
| 6,563,454 | B2 | * | 5/2003 | Akasu | G01S 13/343 342/109 |
| 6,646,587 | B2 | * | 11/2003 | Funai | G01S 13/26 342/26 R |
| 6,812,824 | B1 | * | 11/2004 | Goldinger | G01S 13/84 340/10.1 |
| 7,420,502 | B2 | * | 9/2008 | Hartzstein | G01S 13/343 342/70 |

(Continued)

*Primary Examiner* — Peter M Bythrow
(74) *Attorney, Agent, or Firm* — Cantor Colburn LLP

(57) ABSTRACT

A radar system includes one or more antennas to emit transmit signals and receive reflected signals resulting from reflection of the transmit signals by an object. The transmit signals are linear frequency modulated continuous wave (LFMCW) signals. The radar system also includes a transmission generator to generate the transmit signals. The transmission generator includes a controller to control output of a first of the transmit signals and a second of the transmit signals in succession. A time between transmission of the first of the transmit signals and the second of the transmit signals is less than a duration of a stabilization period of a first oscillator used to generate the first of the transmit signals.

16 Claims, 3 Drawing Sheets

(56) References Cited

U.S. PATENT DOCUMENTS

| | | | | |
|---|---|---|---|---|
| 8,823,583 | B2* | 9/2014 | Hasch | G01S 7/354 |
| | | | | 342/194 |
| 9,219,487 | B1* | 12/2015 | Stuhlberger | H03C 3/0925 |
| 9,448,303 | B2* | 9/2016 | Kishigami | G01S 13/284 |
| 2005/0165567 | A1* | 7/2005 | Inatsune | H03M 1/1038 |
| | | | | 702/66 |
| 2008/0284641 | A1* | 11/2008 | Spreadbury | G01S 13/24 |
| | | | | 342/201 |
| 2009/0256740 | A1* | 10/2009 | Teshirogi | G01S 7/282 |
| | | | | 342/204 |
| 2012/0112806 | A1* | 5/2012 | Dayi | H03L 7/23 |
| | | | | 327/145 |
| 2012/0242538 | A1* | 9/2012 | Hasch | G01S 13/931 |
| | | | | 342/194 |
| 2018/0136323 | A1* | 5/2018 | Pozdniakov | G01S 13/88 |
| 2018/0175905 | A1* | 6/2018 | Nabki | H04L 25/03834 |
| 2018/0259641 | A1* | 9/2018 | Vacanti | G01S 13/4472 |

\* cited by examiner

REDUNDANT FREQUENCY MODULATORS IN RADAR SYSTEM

The subject disclosure relates to redundant frequency modulators in a radar system.

Vehicles (e.g., automobiles, trucks, construction equipment, farm equipment, automated manufacturing equipment) increasingly use sensors to detect objects in their vicinity. The detection may be used to augment or automate vehicle operation. Exemplary sensors include cameras, light detection and ranging (lidar) systems, radio detection and ranging (radar) systems. The radar may output a frequency modulated continuous wave (FMCW) signal and, more particularly, a linear frequency modulated continuous wave (LFMCW) signal, referred to as a chirp. The maximum detectable velocity for an object detected in the field of view of the radar system is based on the maximum chirp repetition frequency. Thus, more frequency transmissions of chirps allow detection of a higher velocity. However, the frequency at which chirps can be provided for transmission is limited by the stabilization time of the oscillator used to generate the chirps. Accordingly, it is desirable to provide redundant frequency modulators in the radar system.

SUMMARY

In one exemplary embodiment, a radar system includes one or more antennas to emit transmit signals and receive reflected signals resulting from reflection of the transmit signals by an object. The transmit signals are linear frequency modulated continuous wave (LFMCW) signals. The radar system also includes a transmission generator to generate the transmit signals. The transmission generator includes a controller to control output of a first of the transmit signals and a second of the transmit signals in succession. A time between transmission of the first of the transmit signals and the second of the transmit signals is less than a duration of a stabilization period of a first oscillator used to generate the first of the transmit signals.

In addition to one or more of the features described herein, the transmission generator includes a second oscillator used to generate the second of the transmit signals.

In addition to one or more of the features described herein, the transmission generator includes a multiplexer.

In addition to one or more of the features described herein, the controller controls the multiplexer to output one of the transmit signals generated based on the first oscillator and another of the transmit signals generated based on the second oscillator, successively.

In addition to one or more of the features described herein, the controller controls the output of the second of the transmit signals during the stabilization period of the first oscillator and to control an output of a third of the transmit signals, successively generated using the first oscillator, during a stabilization period of the second oscillator.

In addition to one or more of the features described herein, the radar system is in a vehicle.

In addition to one or more of the features described herein, information obtained from the reflected signals of the radar system are used to augment or automate operation of the vehicle.

In another exemplary embodiment, a method of configuring a radar system includes arranging one or more antennas to emit transmit signals and receive reflected signals resulting from reflection of the transmit signals by an object. The transmit signals are linear frequency modulated continuous wave (LFMCW) signals. The method also includes assembling a transmission generator to generate the transmit signals. The transmission generator exhibits redundancy in the generation of the transmit signals. A controller is configured to control an output of a first of the transmit signals and a second of the transmit signals to be in succession. A time between transmission of the first of the transmit signals and the second of the transmit signals is less than a duration of a stabilization period of a first oscillator used to generate the first of the transmit signals.

In addition to one or more of the features described herein, the method also includes generating the second of the transmit signals using a second oscillator.

In addition to one or more of the features described herein, the configuring the controller includes coupling the controller to a multiplexer.

In addition to one or more of the features described herein, the configuring the controller includes configuring the controller to control the multiplexer to output one of the transmit signals generated based on the first oscillator and another of the transmit signals generated based on the second oscillator, successively.

In addition to one or more of the features described herein, the configuring the controller includes configuring the controller to control the output of the second of the transmit signals during the stabilization period of the first oscillator and to control an output of a third of the transmit signals, successively generated using the first oscillator, during a stabilization period of the second oscillator.

In addition to one or more of the features described herein, the method also includes disposing the radar system in a vehicle.

In addition to one or more of the features described herein, the method also includes coupling the radar system to a vehicle controller. Information obtained from the reflected signals of the radar system are used to augment or automate operation of the vehicle.

In yet another exemplary embodiment, a vehicle includes a radar system than includes one or more antennas to emit transmit signals and receive reflected signals resulting from reflection of the transmit signals by an object. The transmit signals being linear frequency modulated continuous wave (LFMCW) signals. The radar system also includes a transmission generator to generate the transmit signals. The transmission generator includes a controller to control output of a first of the transmit signals and a second of the transmit signals in succession. A time between transmission of the first of the transmit signals and the second of the transmit signals is less than a duration of a stabilization period of a first oscillator used to generate the first of the transmit signals. The vehicle also includes a vehicle controller to use information obtained from the reflected signals of the radar system are used to augment or automate operation of the vehicle.

In addition to one or more of the features described herein, the transmission generator includes a second oscillator used to generate the second of the transmit signals.

In addition to one or more of the features described herein, the transmission generator includes a multiplexer.

In addition to one or more of the features described herein, the controller controls the multiplexer to output one of the transmit signals generated based on the first oscillator and another of the transmit signals generated based on the second oscillator, successively.

In addition to one or more of the features described herein, the controller controls the output of the second of the transmit signals during the stabilization period of the first oscillator and to control an output of a third of the transmit signals, successively generated using the first oscillator, during a stabilization period of the second oscillator.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
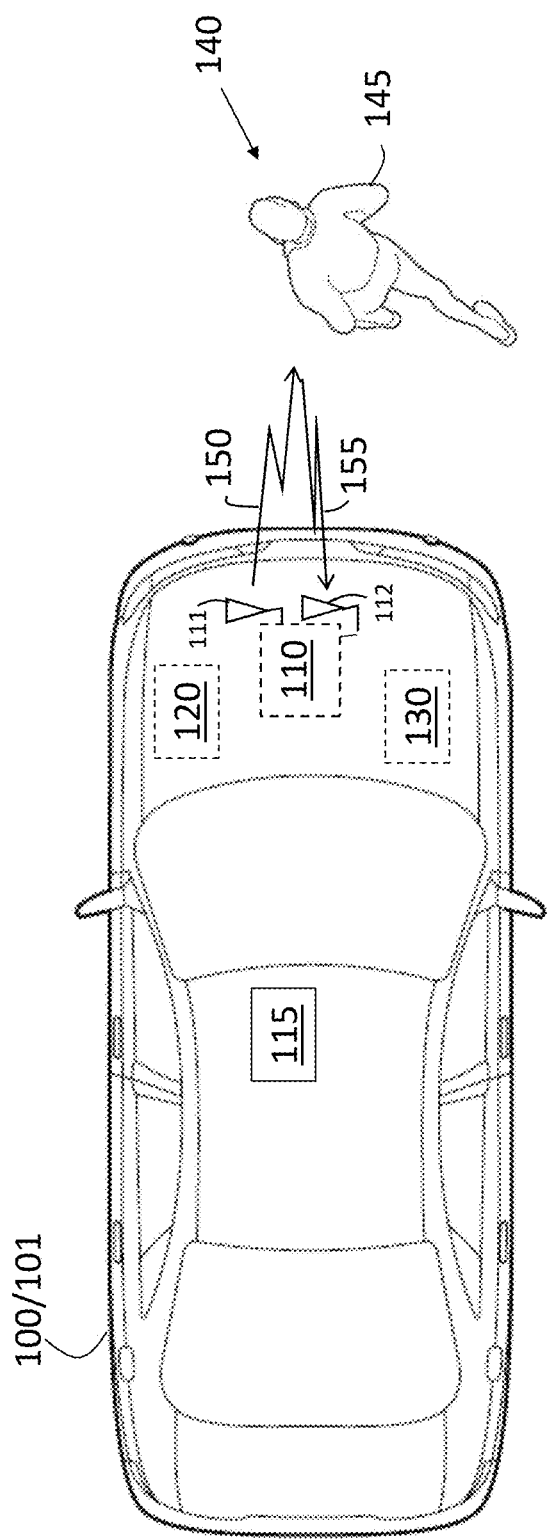
FIG. 1 is a block diagram of a scenario involving a radar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a radar system may be among the sensors used in a vehicle, for example, to detect and track objects in order to augment or automate vehicle operation. An LFMCW signal (i.e., chirp) may be generated by a modulation block that uses a phase locked loop (PLL), direct digital synthesis (DDS), or another known topology. As also noted, the higher the frequency with which the chirps are transmitted, the higher the maximum detectable velocity of the radar system. In this regard, the oscillator of the modulation block is the limiting factor, because the oscillator requires time to stabilize after the generation of each chirp. Embodiments of the systems and methods detailed herein relate to redundant frequency modulators in a radar system in order to facilitate an increase in the chirp repetition frequency.

In accordance with an exemplary embodiment, FIG. 1 is a block diagram of a scenario involving a radar system 110. The vehicle 100 shown in FIG. 1 is an automobile 101. A transmit antenna 111 that transmits a transmit signal 150, and a receive antenna 112 that receives a resulting reflection 155 are shown for the exemplary radar system 110 of FIG. 2. In alternate or additional embodiments, the radar system 110 may include transceivers or additional transmit antennas 111 and receive antennas 112. In addition, the exemplary radar system 110 is shown under the hood of the automobile 101. According to alternate or additional embodiments, one or more radar systems 110 may be located elsewhere in or on the vehicle 100. Another sensor 115 (e.g., camera, sonar, lidar system) is shown, as well. Information obtained by the radar system 110 and one or more other sensors 115 may be provided to a controller 120 (e.g., electronic control unit (ECU)) for image or data processing, target recognition, and subsequent vehicle control.

The controller 120 may use the information to control one or more vehicle systems 130. In an exemplary embodiment, the vehicle 100 may be an autonomous vehicle and the controller 120 may perform known vehicle operational control using information from the radar system 110 and other sources. In alternate embodiments, the controller 120 may augment vehicle operation using information from the radar system 110 and other sources as part of a known system (e.g., collision avoidance system, adaptive cruise control system, driver alert). The radar system 110 and one or more other sensors 115 may be used to detect objects 140, such as the pedestrian 145 shown in FIG. 1. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
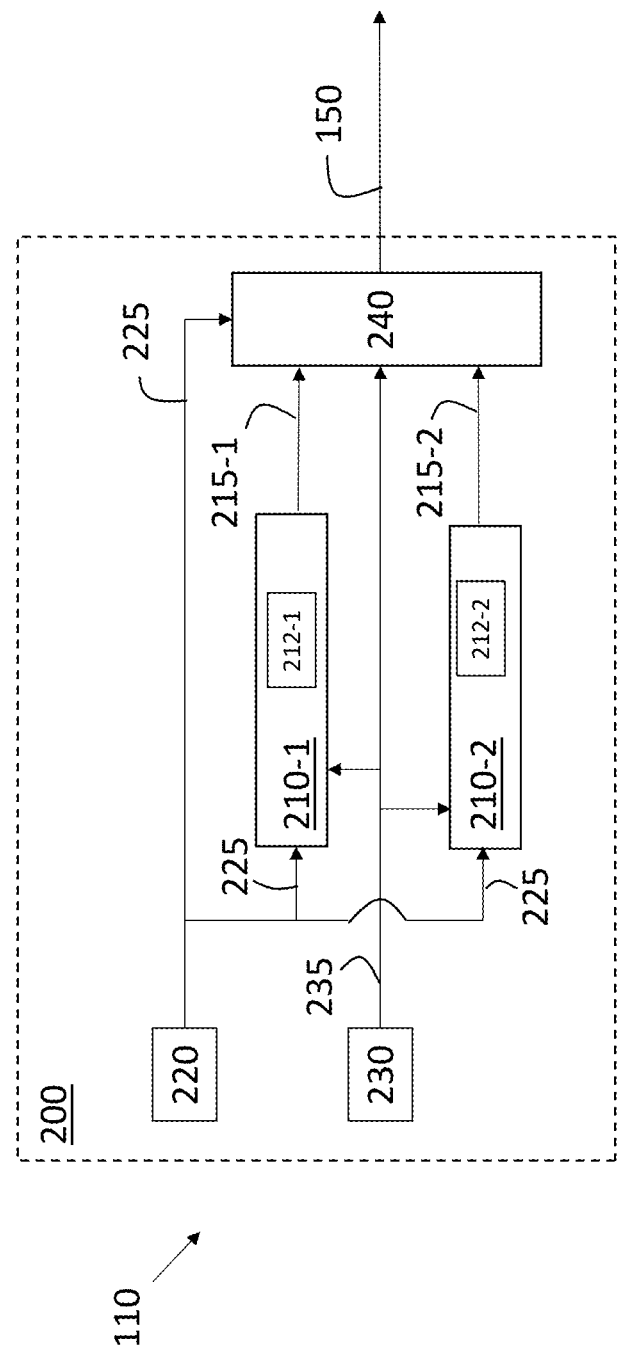
FIG. 2 is a block diagram of aspects of the radar system according to one or more embodiments.

FIG. 2 is a block diagram of aspects of the radar system 110 according to one or more embodiments. Specifically, a transmission generator 200 that generates the transmit signal 150, according to exemplary embodiments, is shown. Two modulation blocks 210-1, 210-2 (generally referred to as 210) are shown and represent the redundancy in the radar system 110. Each modulation block 210-1, 210-2 includes a respective oscillator 212-1, 212-2 (generally referred to as 212). The stabilization period 310 (FIG. 3) required for the oscillators 212 gives rise to the redundancy represented by the transmission generator 200, according to one or more embodiments.

The modulation blocks 210 output chirps 215-1, 215-2 (generally referred to as 215). A multiplexer 240 selects between the chirp 215-1 output by the modulation block 210-1 and the chirp 215-2 output by the modulation block 210-2 based on a control signal 235 from a controller 230. A clock 220 provides a clock signal 225 to the modulation blocks 210 and the multiplexer 240. The modulation blocks 210 may implement a PLL, DDS, or other known method for generating the chirps 215. Because of the redundancy of the modulation blocks 210-1, 201-2, the chirp repetition frequency (i.e., the rate of transmission of the transmit signal 150), is increased as discussed with reference to FIG. 3.

Figure 3:
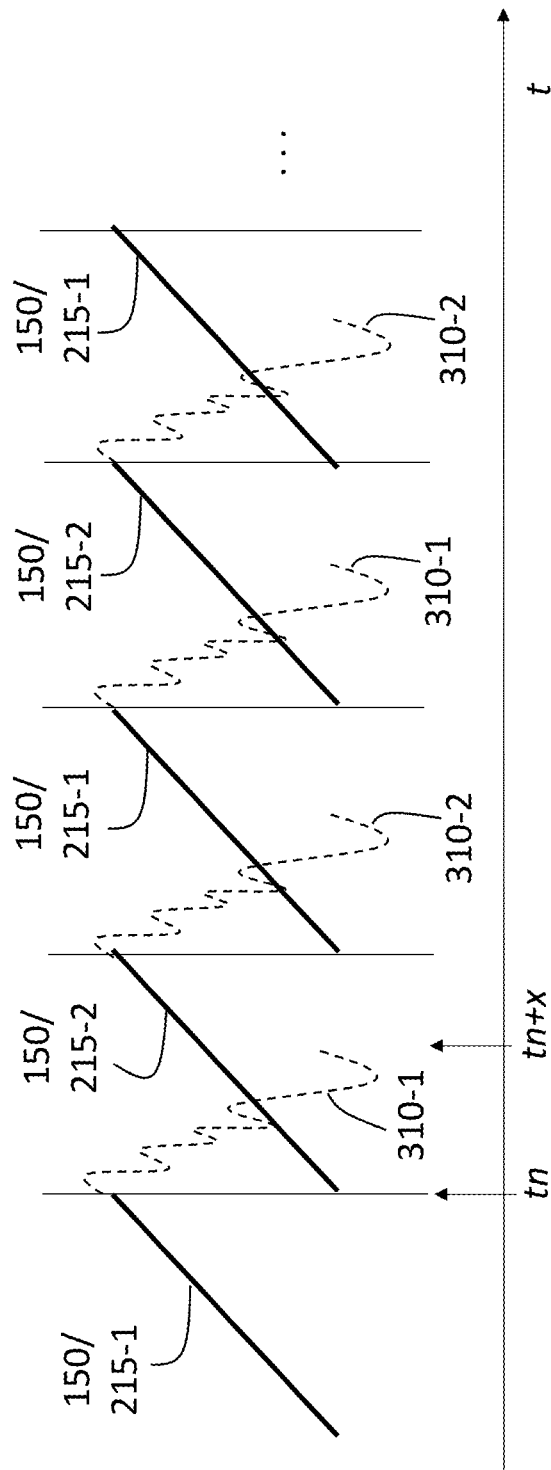
FIG. 3 illustrates the transmission rate of the transmit signal according to one or more embodiments.

FIG. 3 illustrates the transmission rate of the transmit signal 150 according to one or more embodiments. As FIG. 3 indicates, the transmit signal 150 alternates from being the chirp 215-1, which is output by the modulation block 210-1, and the chirp 215-2, which is output by the modulation block 210-2. Time t is indicated. The multiplexer 240 facilitates the switch in the transmit signal 150. The stabilization periods 310-1, 310-2 (generally referred to as 310) that respectively follow the chirps 215-1, 215-2 are also shown. As previously noted, the stabilization periods 310-1, 310-2 correspond with those of the oscillators 212-1, 212-2. As FIG. 3 indicates, the second transmit signal 150 that is shown (i.e., chirp 215-2), is generated at time tn. However, if the second modulation block 210-2 were not present, as is the case in a conventional radar system 110, then the modulation block 210-1 could not generate the next transmit signal 150 until the stabilization period 310-1 ended, which is a later time tn+x.

Thus, because the multiplexer 240 selects the chirps 215-1 and 215-2 in an alternating fashion, the stabilization period 310 of each modulation block 210 is not a period of transmission inactivity. Accordingly, the transmission rate or chirp repetition frequency is increased. While two modulation blocks 210 are shown in FIG. 2, the number of modulation blocks 210 and the scheme used by the controller 230 to select the chirps 215 output by the modulation blocks 210 is not limited by the exemplary configuration. For example, three or more modulation blocks 210 may provide chirps 215 to the multiplexer 240 for selection. In addition, the radar system 110 is not limited in the way that the transmission rate shown in FIG. 3 is achieved. For example, the modulation blocks 210 may output the chirps 215 at the rate shown in FIG. 3, thereby not generating a next chirp 215 as soon as the stabilization period 310 is completed. According to alternate embodiments, the chirps 215 may be generated as soon as possible (e.g., the second chirp 215-1 shown in FIG. 3 is generated at tn+x) and then buffered to achieve the transmission rate shown.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A radar system, comprising:
   one or more antennas to emit transmit signals and receive reflected signals resulting from reflection of the transmit signals by an object, the transmit signals being linear frequency modulated continuous wave (LFMCW) signals; and
   a transmission generator configured to generate the transmit signals, the transmission generator including a controller configured to control output of a first of the transmit signals and a second of the transmit signals in succession, wherein a time between emission of the first of the transmit signals and the second of the transmit signals is less than a duration of a stabilization period of a first oscillator used to generate the first of the transmit signals, and the transmission generator including a multiplexer controlled by the controller and configured to output the first of the transmit signals and the second of the transmit signals, successively, to the one or more antennas.

2. The radar system according to claim 1, wherein the transmission generator includes a second oscillator used to generate the second of the transmit signals.

3. The radar system according to claim 2, wherein the controller is configured to control the multiplexer to output one of the transmit signals generated based on the first oscillator and another of the transmit signals generated based on the second oscillator, successively.

4. The radar system according to claim 2, wherein the controller is configured to control the output of the second of the transmit signals during the stabilization period of the first oscillator and to control an output of a third of the transmit signals, successively generated using the first oscillator, during a stabilization period of the second oscillator.

5. The radar system according to claim 1, wherein the radar system is in a vehicle.

6. The radar system according to claim 5, wherein information obtained from the reflected signals of the radar system are used to augment or automate operation of the vehicle.

7. A method of configuring a radar system, the method comprising:
   arranging one or more antennas to emit transmit signals and receive reflected signals resulting from reflection of the transmit signals by an object, the transmit signals being linear frequency modulated continuous wave (LFMCW) signals;
   assembling a transmission generator to generate the transmit signals;
   configuring a controller to control an output of a first of the transmit signals and a second of the transmit signals to be in succession, wherein a time between emission of the first of the transmit signals and the second of the transmit signals is less than a duration of a stabilization period of a first oscillator used to generate the first of the transmit signals, and
   controlling a multiplexer, using the controller, to output the first of the transmit signals and the second of the transmit signals, successively, to the one or more antennas.

8. The method according to claim 7, further comprising generating the second of the transmit signals using a second oscillator.

9. The method according to claim 8, wherein the configuring the controller includes configuring the controller to control the multiplexer to output one of the transmit signals generated based on the first oscillator and another of the transmit signals generated based on the second oscillator, successively.

10. The method according to claim 8, wherein the configuring the controller includes configuring the controller to control the output of the second of the transmit signals during the stabilization period of the first oscillator and to control an output of a third of the transmit signals, successively generated using the first oscillator, during a stabilization period of the second oscillator.

11. The method according to claim 7, further comprising disposing the radar system in a vehicle.

12. The method according to claim 11, further comprising coupling the radar system to a vehicle controller, wherein information obtained from the reflected signals of the radar system are used to augment or automate operation of the vehicle.

13. A vehicle, comprising:
   a radar system comprising:
      one or more antennas to emit transmit signals and receive reflected signals resulting from reflection of the transmit signals by an object, the transmit signals being linear frequency modulated continuous wave (LFMCW) signals; and
      a transmission generator configured to generate the transmit signals, the transmission generator including a controller configured to control output of a first of the transmit signals and a second of the transmit signals in succession, wherein a time between emission of the first of the transmit signals and the second of the transmit signals is less than a duration of a stabilization period of a first oscillator used to generate the first of the transmit signals, and the transmission generator including a multiplexer controlled by the controller and configured to output the first of the transmit signals and the second of the transmit signals, successively, to the one or more antennas; and
   a vehicle controller configured to use information obtained from the reflected signals of the radar system are used to augment or automate operation of the vehicle.

14. The vehicle according to claim 13, wherein the transmission generator includes a second oscillator used to generate the second of the transmit signals.

15. The vehicle according to claim 14, wherein the controller is configured to control the multiplexer to output one of the transmit signals generated based on the first oscillator and another of the transmit signals generated based on the second oscillator, successively.

16. The vehicle according to claim 14, wherein the controller is configured to control the output of the second of the transmit signals during the stabilization period of the first oscillator and to control an output of a third of the transmit signals, successively generated using the first oscillator, during a stabilization period of the second oscillator.

\* \* \* \* \*